United States Patent [19]
Sato

[11] Patent Number: 4,953,114
[45] Date of Patent: Aug. 28, 1990

[54] IMAGE SIGNAL PROCESSING APPARATUS

[75] Inventor: Hiroaki Sato, Tokyo, Japan

[73] Assignee: Canon Kabushiki Kaisha, Tokyo, Japan

[21] Appl. No.: 456,615

[22] Filed: Dec. 29, 1989

Related U.S. Application Data

[63] Continuation of Ser. No. 327,376, Mar. 23, 1989, abandoned, which is a continuation of Ser. No. 22,606, Mar. 5, 1987, abandoned, which is a continuation of Ser. No. 674,850, Nov. 26, 1984, abandoned.

[30] Foreign Application Priority Data

Dec. 2, 1983 [JP] Japan ................................ 58-227073

[51] Int. Cl.$^5$ ............................................... G06K 9/36
[52] U.S. Cl. ...................................... 382/50; 358/456; 382/54
[58] Field of Search ............................ 382/22, 50, 54; 358/447, 455, 456, 457

[56] References Cited

U.S. PATENT DOCUMENTS

| | | | |
|---|---|---|---|
| 3,973,239 | 8/1976 | Kakumoto et al. | 382/54 |
| 4,074,231 | 2/1978 | Yajima et al. | 382/54 |
| 4,194,221 | 3/1980 | Stoffel | 358/283 |
| 4,288,821 | 9/1981 | Lavallee | 358/283 |
| 4,414,581 | 11/1983 | Kato et al. | 358/283 |
| 4,524,385 | 6/1985 | Billingsley et al. | 382/41 |
| 4,651,293 | 3/1987 | Kato | 358/283 |
| 4,686,579 | 8/1987 | Sakamoto | 358/283 |
| 4,691,366 | 9/1987 | Fenster | 382/22 |
| 4,723,173 | 2/1988 | Tanioka | 358/283 |

Primary Examiner—Leo H. Boudreau
Attorney, Agent, or Firm—Fitzpatrick, Cella, Harper & Scinto

[57] ABSTRACT

An image signal processing apparatus has first processing device for processing an image signal in a first mode, and a second for processing the image signal in a second mode. The first processing device eliminates a selected frequency component from the image signal. The first or second processing device is selected by an image discrimination signal.

19 Claims, 4 Drawing Sheets

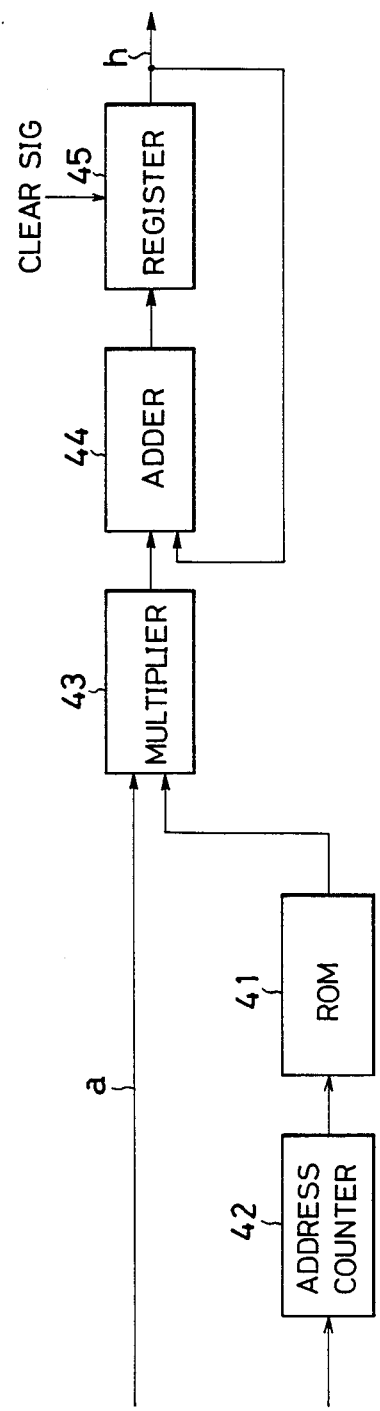
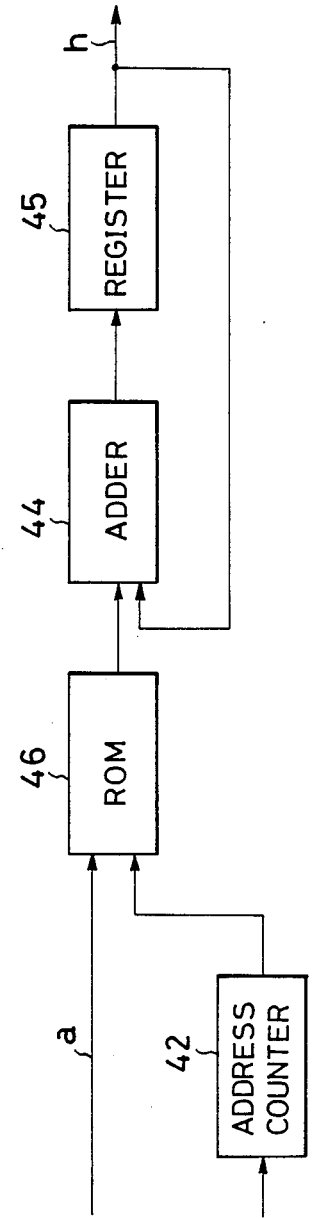

FIG. 5A $$\frac{1}{256} \times$$

| 0 | 0 | 0 | 0 | 0 | 0 | 0 | 0 | 0 |
|---|---|---|---|---|---|---|---|---|
| 0 | 1 | 2 | 3 | 4 | 3 | 2 | 1 | 0 |
| 0 | 2 | 4 | 6 | 8 | 6 | 4 | 2 | 0 |
| 0 | 3 | 6 | 9 | 12 | 9 | 6 | 3 | 0 |
| 0 | 4 | 8 | 12 | 16 | 12 | 8 | 6 | 0 |
| 0 | 3 | 6 | 9 | 12 | 9 | 6 | 3 | 0 |
| 0 | 2 | 4 | 6 | 8 | 6 | 4 | 2 | 0 |
| 0 | 1 | 2 | 3 | 4 | 3 | 2 | 1 | 0 |
| 0 | 0 | 0 | 0 | 0 | 0 | 0 | 0 | 0 |

FIG. 5B

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0.5 | 0 | −1 | 0 | 0.5 | 0 | 0 |
| 0 | 0 | 0 | 0 | 0 | 0 | 0 | 0 | 0 |
| 0 | 0 | −1 | 0 | 3 | 0 | −1 | 0 | 0 |
| 0 | 0 | 0 | 0 | 0 | 0 | 0 | 0 | 0 |
| 0 | 0 | 0.5 | 0 | −1 | 0 | 0.5 | 0 | 0 |
| 0 | 0 | 0 | 0 | 0 | 0 | 0 | 0 | 0 |
| 0 | 0 | 0 | 0 | 0 | 0 | 0 | 0 | 0 |

FIG. 5C

| 0 | 0 | 0 | 0 | 2 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | −3 | 0 | 0 | 0 | 0 |
| 0 | 0 | 0 | 0 | 0 | 0 | 0 | 0 | 0 |
| 2 | 0 | −3 | 0 | 4 | 0 | −3 | 0 | 2 |
| 0 | 0 | 0 | 0 | 0 | 0 | 0 | 0 | 0 |
| 0 | 0 | 0 | 0 | −3 | 0 | 0 | 0 | 0 |
| 0 | 0 | 0 | 0 | 0 | 0 | 0 | 0 | 0 |
| 0 | 0 | 0 | 0 | 2 | 0 | 0 | 0 | 0 |

FIG. 5D

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 1 | 1 | 1 | 1 | 1 | 0 | 0 |
| 0 | 0 | 1 | 1 | 1 | 1 | 1 | 0 | 0 |
| 0 | 0 | 1 | 1 | 1 | 1 | 1 | 0 | 0 |
| 0 | 0 | 1 | 1 | 1 | 1 | 1 | 0 | 0 |
| 0 | 0 | 1 | 1 | 1 | 1 | 1 | 0 | 0 |
| 0 | 0 | 0 | 0 | 0 | 0 | 0 | 0 | 0 |
| 0 | 0 | 0 | 0 | 0 | 0 | 0 | 0 | 0 |

IMAGE SIGNAL PROCESSING APPARATUS

This application is a continuation division, of application Ser. No. 07/327,376, filed Mar. 23, 1989, now abandoned, which is a continuation of application Ser. No. 07/022,606, filed Mar. 5, 1987, now abandoned which is a continuation of application Ser. No. 06/674,850, filed Nov. 26, 1984 now abandoned.

BACKGROUND OF THE INVENTION

1. Field of the Invention

The present invention relates to an image signal processing apparatus, and more particularly to an image signal processing apparatus which produces an image signal suitable for image reproduction.

2. Description of the Prior Art

In an output device such as a printer or a display which receives a digital or analog image signal, particularly in an output device which displays an image by a combination of output dots of several gray levels by using a dither method, a strong beat is generated when a frequency of the input signal has a specific relation with a frequency of the output dot pattern due to a fold-over error in sampling by an input device, as to well as a periodicity in the output dot pattern. Such a beat appears as a hinders clear perception of the image and substantially deteriorates image quality. This is known as a Moire phenomenon. Attempts have been made to reduce harmful frequency components by optical or electrical techniques eliminate the Moire pattern.

In this method, however, since not only the harmful frequency components but also high frequency components are reduced, the output image is not sharp.

SUMMARY OF THE INVENTION

It is an object of the present invention to porvide an image signal processing apparatus for processing an image signal to reproduce a high quality of image.

It is another object of the present invention to provide an image signal processing apparatus having an image discrimination function.

It is other another of the present invention to provide an image processing apparatus which reproduces a high quality of image and has a simple construction.

It is another object of the present invention to provide an image signal processing apparatus which can eliminate harmful frequency components in reproducing an image.

It is another object of the present invention to provide an image signal processing apparatus which produces an optimum image signal in real time.

Other objects and features of the present invention will be apparent from the following description of the invention taken in conjunction with the accompanying drawings.

BRIEF DESCRIPTION OF THE DRAWINGS

FIG. 4A is a block diagram of a filtering circuit with a multiplier, FIG. 4B is a block diagram of a filtering circuit without a multiplier, FIG. 5A shows a coefficient matrix used in the filtering circuit, FIG. 5B shows a coefficient matrix used in an edge emphasis circuit, FIGS. 5C and 5D show coefficient matrices used in the amplitude detector.

DETAILED DESCRIPTION OF THE PREFERRED EMBODIMENTS

Figure 1:
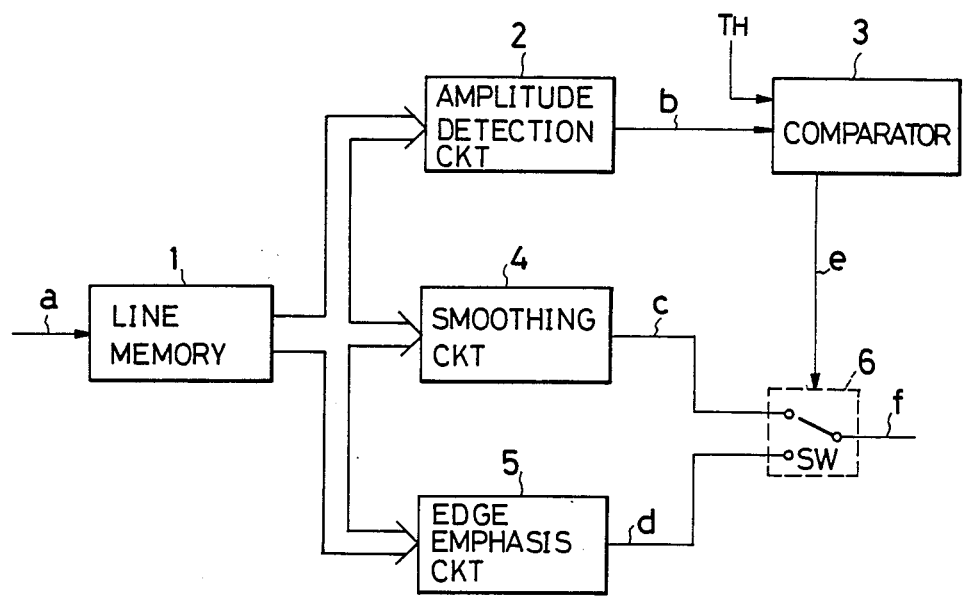
FIG. 1 shows a signal processing circuit in one embodiment of the present invention.

FIG. 1 shows a signal processing circuit in one embodiment of the present invention, in which a digital image signal is used. A symbol a denotes a digital image signal including a half-tone image signal such as a dot image signal or photograph. Numeral 1 denotes a line memory for storing as many lines of image signal a as are required for processing, numeral 2 denotes an amplitude detector for detecting an amplitude of the image signal a in a vicinity of a frequency at which a visual obstacle (i.e., a feature in a reproduced image which tends to impede clear perception of the image information contained in the original) will be generated and numeral 3 denotes a comparator for comparing an output signal b of the detector 2 with a threshold TH to divide each pixel into areas depending on the dot image or the half-tone image. The amplitude detector 2 and the comparator 3 constitute an image content discriminator. Numeral 4 denotes a filtering or smoothing circuit for eliminating frequency components causing the visual obstacle from the image signal a, numeral 5 denotes an edge emphasis circuit for emphasizing necessary frequency components in the image signal a, and numeral 6 denotes a switch which selects an output signal d of the filtering circuit 4 or an output signal d of the edge emphasis circuit 5 in response to by an output signal e of the comparator 3, to output an output signal f.

Figure 2:
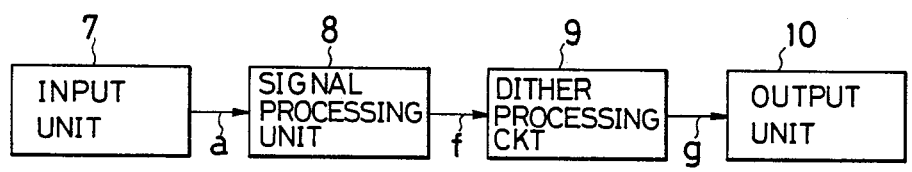
FIG. 2 is a block diagram of an input/output apparatus.

FIG. 2 is a block diagram of an input/output apparatus which incorporates the circuit of FIG. 1. Numeral 7 denotes an input unit which produces the digital image signal a, which may be a CCD image reader, numeral 8 denotes a signal processing unit which corresponds to the circuit of FIG. 1, numeral 9 denotes a dither processingcircuit for converting the output signal f of the signal processing unit 8 to a dot pattern by a predetermined dither pattern (dither matrix) to reproduce gray levels, and numeral 10 denotes an output unit such as a laser beam printer which outputs a dot pattern image.

Operation of the Embodiment of FIG. 2 is now described. The digital image signal a produced by the input unit 7 is stored in the line memory 1 (FIG. 1) in the signal processing unit 8. Data in the line memory 1 for necessary pixels (data for pixels under consideration and peripheral pixels) are supplied to the amplitude detector 2, the filtering circuit 4 and the edge emphasis circuit 5. The amplitude detector 2 produces a signal b representing the amplitude of the frequency components of the pixels being processed, based on the data of the pixels under consideration and the data of the peripheral pixels. The filtering circuit 4 and the edge emphasis circuit 5 produce the filtered signal c, which has reduced frequency components of the pixel data under consideration, and the edge emphasized signal d, which has frequency components other than the frequency components of the pixel data under consideration emphasized, based on the data of the pixels under consideration and the data of the peripheral pixels.

The amplitude signal b is compared with the threshold TH by the comparator 3, and if b>TH, the comparator 3 produces a "1" area division signal e, and if b<TH, it produces the "0" as area division signal e. The switch 6 selects a filtered signal c if the input area division signal e is "1", and selects the edge emphasized signal d if the signal e is "0" to output the output signal f. The output signal f is converted to a binary or multi-value signal g representing a dot pattern by the dither processing circuit 9, and the dots are printed in accordance with the signal g to reproduce an image by the output unit 10.

The above operation is explained in more detail. When the input image signal a is a dot image, the frequency characteristic is given by FIG. 6A, in which an abscissa f represents frequency and the ordinate Am represents amplitude. When the input image signal is the dot image, the image signal includes a high frequency component F(a) which causes a visual obstacle or Moire phenomenon. In the present embodiment, the presence or absence of the high frequency component F(a) is detected by the amplitude detector 2 and the comparator 3 to determine if the pixels under consideration are dot image or not. The filtering circuit 4 serves to eliminate (or reduce) the high frequency component F(a) from the pixel data to smooth the image.

Figure 6A:
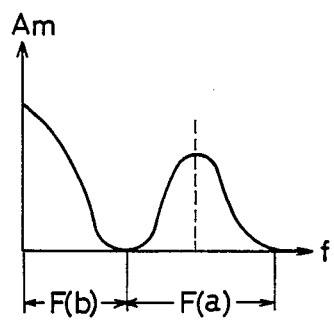
FIG. 6A shows a frequency characteristic of a dot image.
Figure 6B:
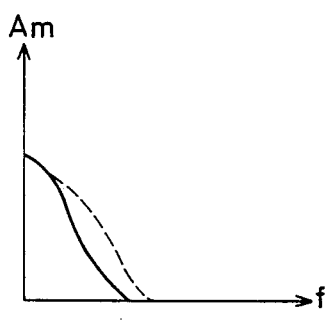
FIG. 6B shows a frequency characteristic of a half-tone image.

When the input image signal a is a half-tone image, the frequency characteristic is given by FIG. 6B, in which the abscissa f represents frequency and the ordinate Am represents amplitude. A broken line shows an ideal half-tone pixel data characteristic and a solid line shows an actual half-tone pixel data characteristic. The edge emphasis circuit 5 serves to emphasize a selected frequency component of the input half-tone pixel data to convert the input data to edge-emphasized pixel data having the characteristic shown by the broken line in FIG. 6B.

In the present embodiment, if the pixel data under consideration is determined to be dot image, the filtering circuit 4 is selected to eliminate the high frequency component F(a) from the pixel data to produce the pixel data. If the pixel data under consideration is not dot image, for example, if it is a half-tone image, the edge emphasis circuit 5 is selected to produce the pixel data d having the selected frequency component emphasized.

Figure 3:
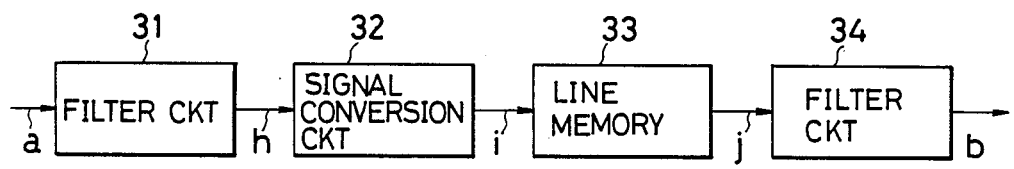
FIG. 3 is a block diagram of an amplitude detector.

FIG. 3 is a block diagram of the amplitude detector 2 of FIG. 1. Numeral 31 denotes a filtering circuit for filtering the digital image signal a, numeral 32 denotes a signal converter which produces a square or an absolute value of output signal h of the filtering circuit 31 and which uses a ROM or a multiplier, numeral 33 denotes a line memory which stores a plurality of lines of an output signal i of the signal converter 32, and numeral 34 denotes a filtering circuit for filtering an output signal j of the line memory 33.

The operation of the above circuit now be explained. The image signal a is applied to the filtering circuit 31 which produces the signal h which has the frequency component to be detected emphasized and the frequency component not to be detected reduced. Referring to FIG. 6A, the filtering circuit 31 emphasizes the frequency component F(a) and reduces the frequency component F(b). The signal h is applied to the signal converter 32 which produces the signal i which is a square or absolute value of the signal h. The signal i is stored in the line memory 33, which sends out necessary data to the filtering circuit 34, which filters the signal j to produce the amplitude signal b at the selected frequency.

FIGS. 4A and 4B are block diagrams of the filtering circuit 31 of FIG. 3 for the digital image signal a. Since the image signal is usually a huge volume of two-dimensional signal, computation time will be very great if the signal h is obtained by a Fourier transform. Accordingly, instead of frequency filtering, convolution integration in a real space is used. The circuit of FIGS. 4A and 4B is for the digital signal, and the convolution integration is effected by multiplication and addition. FIG. 4A shows a block diagram of a vesion of the circuit having an adder 44 and a multiplier 43, and FIG. 4B shows a block diagram of a version of the circuit which uses a ROM containing results of multiplication, instead of the multiplier.

The calculation carried out by the circuit of FIG. 4 is as follows. A coefficient matrix used in filtering is represented by m(i,j) (a center coordinate is (0,0)) and an image signal is represented by f(i, j). Then, an output g(i,j) is given by $$g(i,j) = \sum_{k=-n}^{n} \sum_{l=-M}^{m} f(i-k, j-l) \cdot m(k, l) \quad (1)$$

where m(i,j) is a matrix of 2n×2m size.

In FIG. 4A, numeral 41 denotes a ROM which contains the coefficient matrix m(i,j) as shown in FIG. 5C, numeral 42 denotes an address counter which counts a clock of a predetermined frequency to generate an address to the ROM 41, numeral 43 denotes a multiplier for multiplying a coefficient term, which is output from the ROM 41, with the input signal, and numeral 44 denotes an adder which adds the contents of a register 45 to the output of the multiplier 43.

In operation, the register 45 is initially reset to "0" by a clear signal. Then, the input signal (image signal) is sequentially supplied in accordance with the clock. By counting the clock pulses, the address counter 42 generates an address of the coefficient to be multiplied and the coefficient is read from the ROM 41, using that address. The coefficient is multiplied with the input signal by the multiplier 43, and the output signal thereof is added to the contents of the register 45 by the adder 44, and the sum is stored in the register 45. After being cleared by the clear signal, the register 45 sequentially accumulates the output of the multiplier 43. By repeating the addition a number of times corresponding to the number of data, the equation (a) is carried out. Thus, the register 45 stores therein the signal h.

A ROM 46 shown in FIG. 4B contains the products of multiplication of the contents of the ROM 41 of FIG. 4A by the input signal, and it serves as a combination of the multiplier 43 and the ROM 41.

The filtering circuit 4 and the edge emphasis circuit 5 of FIG. 1 and the filtering circuit 34 of FIG. 3 are constructed in the manners shown in FIGS. 4A and 4B. Accordingly, the present embodiment can process the image signal in real time.

FIGS. 5A, 5B, 5C and 5D show coefficient matrices used in the filtering circuits. FIG. 5A shows a coefficient matrix for the filtering circuit 4, FIG. 5B for the edge emphasis circuit 5, FIG. 5C for the filtering circuit 31 and FIG. 5D for the filtering circuit 34. Those coefficient matrices are stored in the ROM's. If a coefficient is zero in the matrix, no calculation is carried out, and the calculation is carried out only for the non-zero coefficient. In FIG. 5D, all coefficient terms are "1". Accordingly, the filtering circuit 34 does not use the ROM 41, the address counter 42 and the multiplier 43, and the input signal is directly applied to the adder 44.

The coefficient matrices shown in FIGS. 5A–5D are designed for specific frequency filters and they may be modified. In those coefficient matrices, a dither periods is four pixel period.

The coefficient matrix of FIG. 5A is designed to reduce the frequency components, which cause the visual obstacle, at 1/t, 2/t and 3/t cycles/pixel, where t is a dither matrix size represented in terms of pixels, and to avoid not substantially reducing the other frequency components and shifting the phases thereof.

The coefficient matrix of FIG. 5B is designed to emphasize the frequency components above 1/2t cycles/pixel.

The coefficient matrix of FIG. 5C is designed to emphasize the frequency components of 1t, 2/t and 3/t cycles/pixel and suppress other frequency components.

The coefficient matrix of FIG. 5D determines a detection sensitivity, and it is designed taking a visual characteristic into consideration.

The present circuit can eliminate the frequency components which cause visual obstacles and emphasize edges. If the resolution of the input system is relatively high, the edge emphasis circuit may be omitted and the input signal may be used as the output signal as it is so that the amount of hardware required can be reduced.

While the present embodiment is used for digital two-dimensional image signals, the present invention is applicable to a one-dimensional signal such as a speech signal and a three-dimension image signal. It can also be applied to an analog signal by using an integrator instead of the multiplier and the adder.

The present invention is not limited to the illustrated embodiments but many modifications may be made within the scope of the appended claims.

What I claim is:

1. An image signal processing apparatus comprising:
   image signal input means;
   image discrimination means for discriminating whether an image signal is a dot image or not and for producing an image discrimination signal;
   image discrimination signal input means for inputting the image discrimination signal;
   first processing means for processing the image signal input from said image signal input means in a first mode, said first processing means including means for eliminating a predetermined frequency component from the image signal;
   second processing means for processing the image signal input from said image signal input means in a second mode, said second processing means including means for emphasizing a second predetermined frequency component;
   selection means for selecting said first or said second processing means to process the image signal, in accordance with the image discrimination signal input from said image discrimination signal input means; and
   halftone processing means for halftone processing the image signal output from said first or from said second processing means, said halftone processing means being provided in common to said first and second processing means.

2. An image signal processing apparatus according to claim 1, wherein said elimination means eliminates the predetermined frequency component from the image signal in accordance with a predetermined coefficient matrix.

3. An image signal processing apparatus according to claim 1, wherein said image discrimination means discrominates the image in accordance with the predetermined frequency component of the image signal.

4. An image signal processing apparatus according to claim 3, wherein said image discrimination means produces a signal representing the predetermined frequency component and discriminates the image by checking whether said signal is larger than a predetermined magnitude or not.

5. An image signal processing apparatus according to claim 1, wherein said image discrimination means discriminates the image content of the image signal under consideration based on the image signal under consideration and a peripheral image signal of the image signal under consideration.

6. An image signal processing apparatus according to claim 1, wherein said halftone processing means is dither-processing means.

7. An image signal processing apparatus comprising:
   image signal input means;
   discrimination means for discriminating an image content of the input image signal input from said input means, said discrimination means discriminating the image content based on a first predetermined frequency component of the image signal;
   processing means for processing the image signal input from said input means, said processing means including first processing means for processing the image signal input from said input means in a first mode and second processing means for processing the image signal input from said input means in a second mode, as second processing means including means for emphasizing a second frequency component of the image signal which is different from said first frequency component, said first and second processing means being selectively used in accordance with an output from said discrimination means; and
   halftone processing means for halftone processing the image signal output from said first or from said second processing means, said halftone processing means being provided in common to said first and second processing means.

8. An image signal processing apparatus according to claim 7, wherein said first processing means includes mans for eliminating the first predetermined frequency component from the image signal.

9. An image signal processing apparatus according to claim 8, wherein said elimination means eliminates the first predetermined frequency component from the image signal in accordance with a predetermined coefficient matrix.

10. An image signal processing apparatus according to claim 7, wherein said discrimination means discriminater whether the image signal is a dot image or not based on the first predetermined frequency component of the image signal.

11. An image signal processing apparatus according to claim 7, wherein said discrimination means produces a signal representing the first predetermined frequency component and discriminated the image content by checking whether said signal is larger than a predetermined.

12. An image signal processing apparatus according to claim 7, wherein said halftone processing means is dither-processing means.

13. An image signal processing apparatus according to claim 7, wherein said discrimination means discriminates the image content of the image signal under consideration based on the image signal under consideration and a peripheral image signal of the image signal under consideration.

14. An image signal processing apparatus comprising:
image signal input means;
filtering means for filtering the input image signal input from said input means, said filtering means including means for eliminating a predetermined frequency component from the input image signal in accordance with a predetermined pattern;
discrimination means for discriminating whether the input image signal is a dot image or not and causing the input image signal to be filtered by said filtering means when the input image signal is a dot image;
edge emphasis means for emphasizing edges of the input image signal in accordance with a second predetermined pattern, said discriminating means causing said edge emphasis means to edge-emphasize the input image signal when the input image signal is not a dot image; and
dither processing means for dither-processing the image signal filtered by said filtering means or the image signal edge-emphasized by said edge emphasis means, so as to obtain a dot pattern, said dither processing means being provided in common to said filtering means and said edge emphasis means.

15. An image signal processing apparatus comprising:
image signal input means;
discrimination means for discriminating an image content of the input image signal input via said input means;
processing means for processing the image signal input via said input means, said processing means including first processing means for processing the image signal input via said input means in a first mode and second processing means for processing the image signal input via said input means in a second mode different from said first mode, said first and second processing means being used selectively, in accordance with an output from said discrimination means; and
halftone processing means for halftone processing the image signal output from said first or from said second processing means, respectively, said halftone processing means being provided in common to said first and second processing means.

16. An image signal processing apparatus according to claim 15, further comprising selection means which selects the output of said first or said second processing means, in accordance with an image discrimination signal output from said discrimination means.

17. An image signal processing apparatus according to claim 15, wherein said image discrimination means discriminates the image content of the image signal under consideration based on the image signal under consideration and an image signal peripheral to the image signal under consideration.

18. An image signal processing apparatus according to claim 15, wherein said discrimination means discriminates whether the image signal is a dot image or not based on a first predetermined frequency component of the image signal.

19. An image signal processing apparatus according to claim 15, wherein said first processing means includes means for eliminating a first predetermined frequency component from the image signal, and said second processing means includes means for emphasizing a second frequency component of the image signal which is different from said first frequency component.

* * * * *

UNITED STATES PATENT AND TRADEMARK OFFICE
CERTIFICATE OF CORRECTION

PATENT NO. : 4,953,114
DATED : August 28, 1990
INVENTOR(S) : HIROAKI SATO

It is certified that error appears in the above-identified patent and that said Letters Patent is hereby corrected as shown below:

COLUMN 1

Line 25, "to" should be deleted.
    Line 26, "as" should read --as to--.
    Line 27, "appears as a" should be deleted.
    Line 44, "other" should be deleted.

COLUMN 2

Line 37, "signal d" should read --signal c--.

COLUMN 3

Line 6, "the" should read --a--.
    Line 44, "data." should read --data c.--.
    Line 53, "of" should read --of the--.

COLUMN 5

Line 9, "periods" should read --period--.
    Line 10, "period." should read --periods.--.
    Line 35, "three-dimension" should read --three-dimensional--.

COLUMN 6

Line 8, "crominates" should read --criminates--.
    Line 38, "as second" should read --said second--.
    Line 62, "criminater" should read --criminates--.
    Line 69, "discriminated" should read --discriminates--.

UNITED STATES PATENT AND TRADEMARK OFFICE
CERTIFICATE OF CORRECTION

PATENT NO. : 4,953,114
DATED : August 28, 1990
INVENTOR(S) : HIROAKI SATO

It is certified that error appears in the above-identified patent and that said Letters Patent is hereby corrected as shown below:

COLUMN 7

Line 2, "mined." should read --mined magnitude or not.--.

Signed and Sealed this

Seventh Day of April, 1992

Attest:

HARRY F. MANBECK, JR.

*Attesting Officer*  *Commissioner of Patents and Trademarks*